(12) United States Patent
Motz et al.

(10) Patent No.: US 6,205,381 B1
(45) Date of Patent: Mar. 20, 2001

(54) METHOD AND APPARATUS FOR PROVIDING AUTOGUIDANCE FOR MULTIPLE AGRICULTURAL MACHINES

(75) Inventors: Darin S. Motz, Pekin; Michael D. Staub, Washington; Elliott E. Plumer, Trivoli, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/277,082

(22) Filed: Mar. 26, 1999

(51) Int. Cl.⁷ ....................................................... G05D 1/00
(52) U.S. Cl. ................... 701/25; 701/23; 701/25; 701/26; 701/50; 701/200; 701/201; 340/994; 340/995; 340/988; 342/357.13; 342/457
(58) Field of Search ................... 701/23, 25, 26, 701/50, 200, 201, 202, 96; 702/2, 5; 342/357.13, 457; 340/998, 995, 994, 435, 436; 180/167–169; 172/5, 71, 102, 107, 134, 145–148, 687

(56) References Cited

U.S. PATENT DOCUMENTS

| 4,674,048 | * | 6/1987 | Okumura ................................ 701/25 |
| 4,994,970 | * | 2/1991 | Noji et al. ............................... 701/25 |
| 5,426,584 | * | 6/1995 | Kamimura et al. ...................... 701/23 |
| 5,446,656 | * | 8/1995 | Koseki et al. ........................... 701/23 |
| 5,696,675 | * | 12/1997 | Nakamura et al. ...................... 701/50 |
| 5,712,782 | * | 1/1998 | Weigelt et al. . | |
| 5,955,973 | * | 9/1999 | Anderson ............................... 340/988 |
| 5,991,694 | * | 11/1999 | Gudat et al. .............................. 702/2 |
| 6,044,312 | * | 3/2000 | Sudo et al. ............................. 701/25 |
| 6,062,317 | * | 5/2000 | Gharsalli et al. ......................... 172/2 |
| 6,085,135 | * | 7/2000 | Steckel .................................... 701/50 |
| 6,094,616 | * | 7/2000 | Andreas et al. ........................ 701/96 |
| 6,112,143 | * | 8/2000 | Allen et al. ............................. 701/25 |
| 6,119,057 | * | 9/2000 | Kawagoe ............................... 701/23 |
| 6,122,593 | * | 9/2000 | Friederich et al. .................... 701/202 |

FOREIGN PATENT DOCUMENTS

0821296 * 1/1998 (EP) .
2760316 * 9/1995 (FR) .

OTHER PUBLICATIONS

Trimble AgGPS Parallel Swathing Option Web Site: www.trimble.com/products/catalog/agri/agpso.htm.

* cited by examiner

Primary Examiner—Jacques H. Louis-Jacques
Assistant Examiner—Ronnie Mancho
(74) Attorney, Agent, or Firm—Steve D. Lundquist

(57) ABSTRACT

A method and apparatus for providing autoguidance for a plurality of agricultural machines. Each agricultural machine has a work implement attached to it. The method includes the steps of determining a reference path by a first agricultural machine, communicating the location of the reference path to each remaining agricultural machine, and determining a plurality of desired paths parallel to the reference path by each of the plurality of agricultural machines. Each plurality of desired paths is determined as a function of the width of the corresponding work implement for each respective agricultural machine.

24 Claims, 6 Drawing Sheets

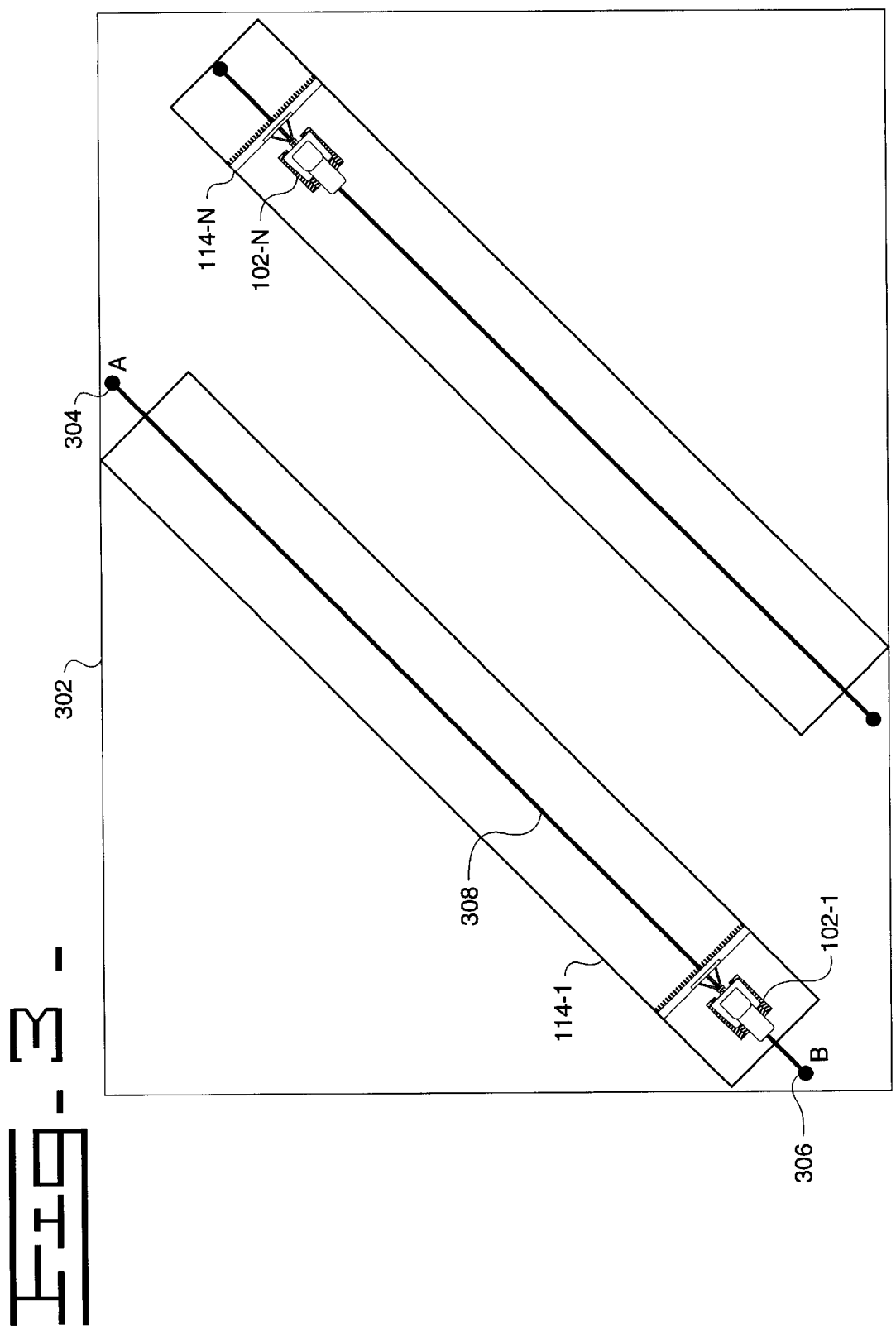

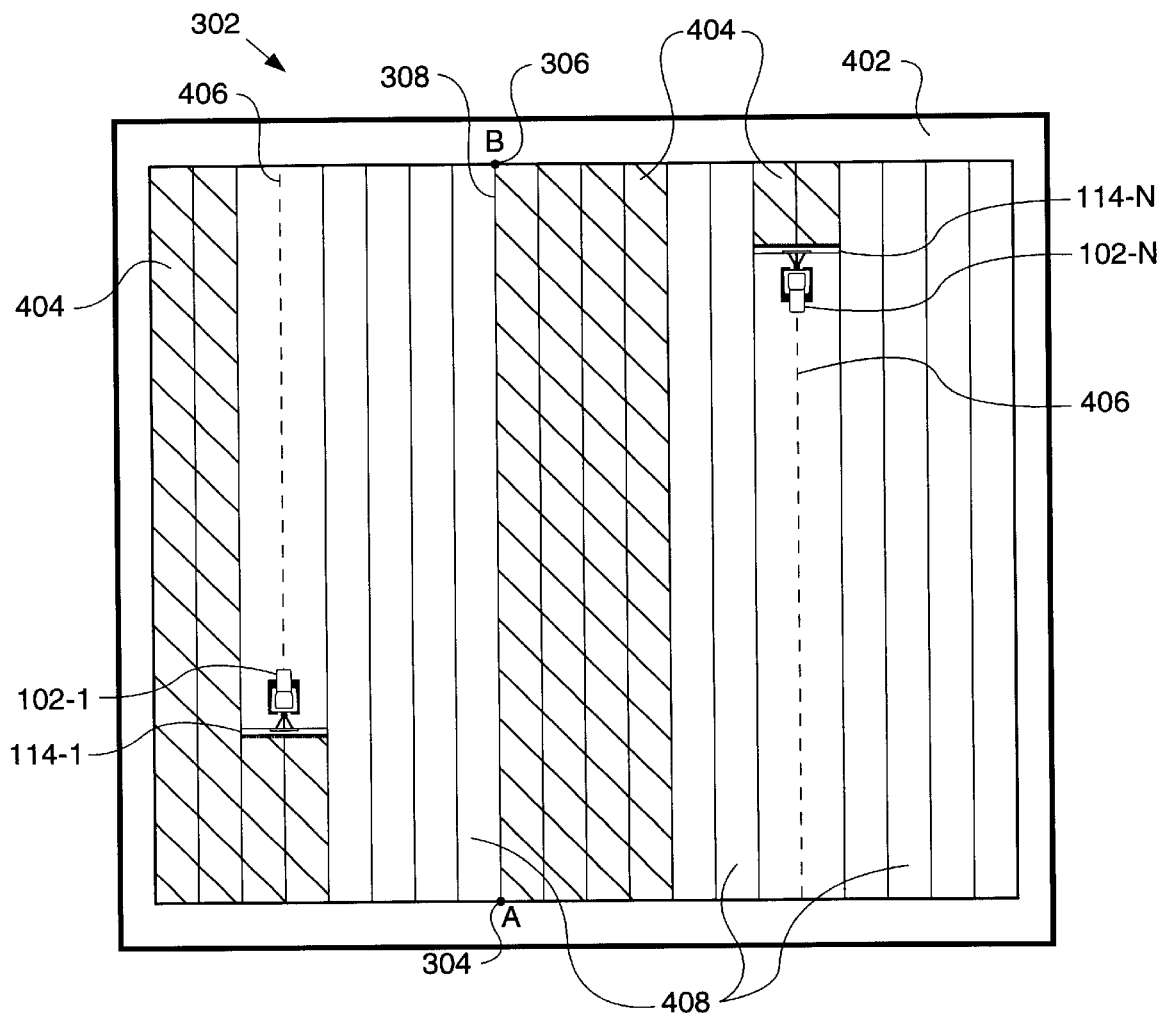

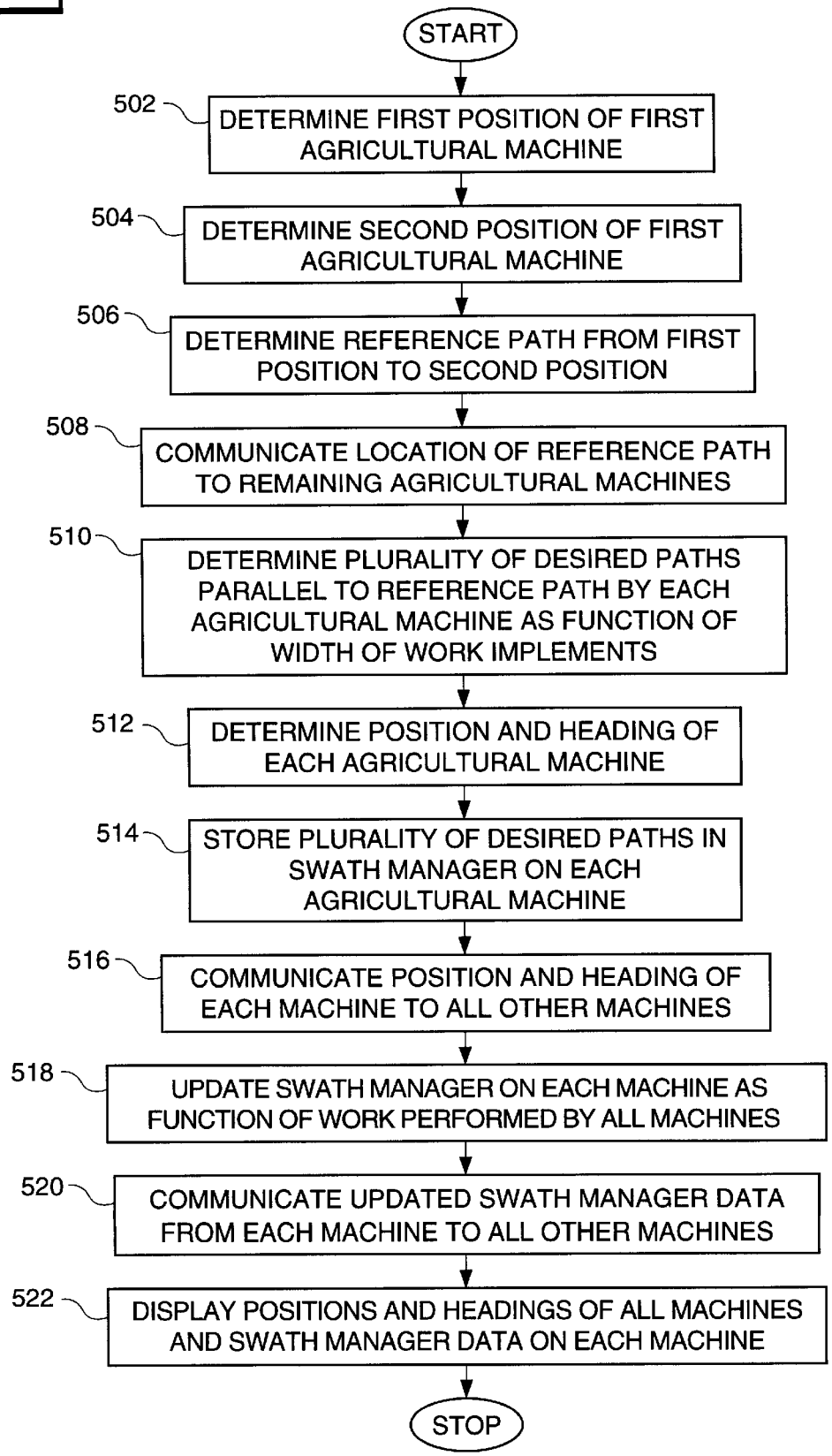

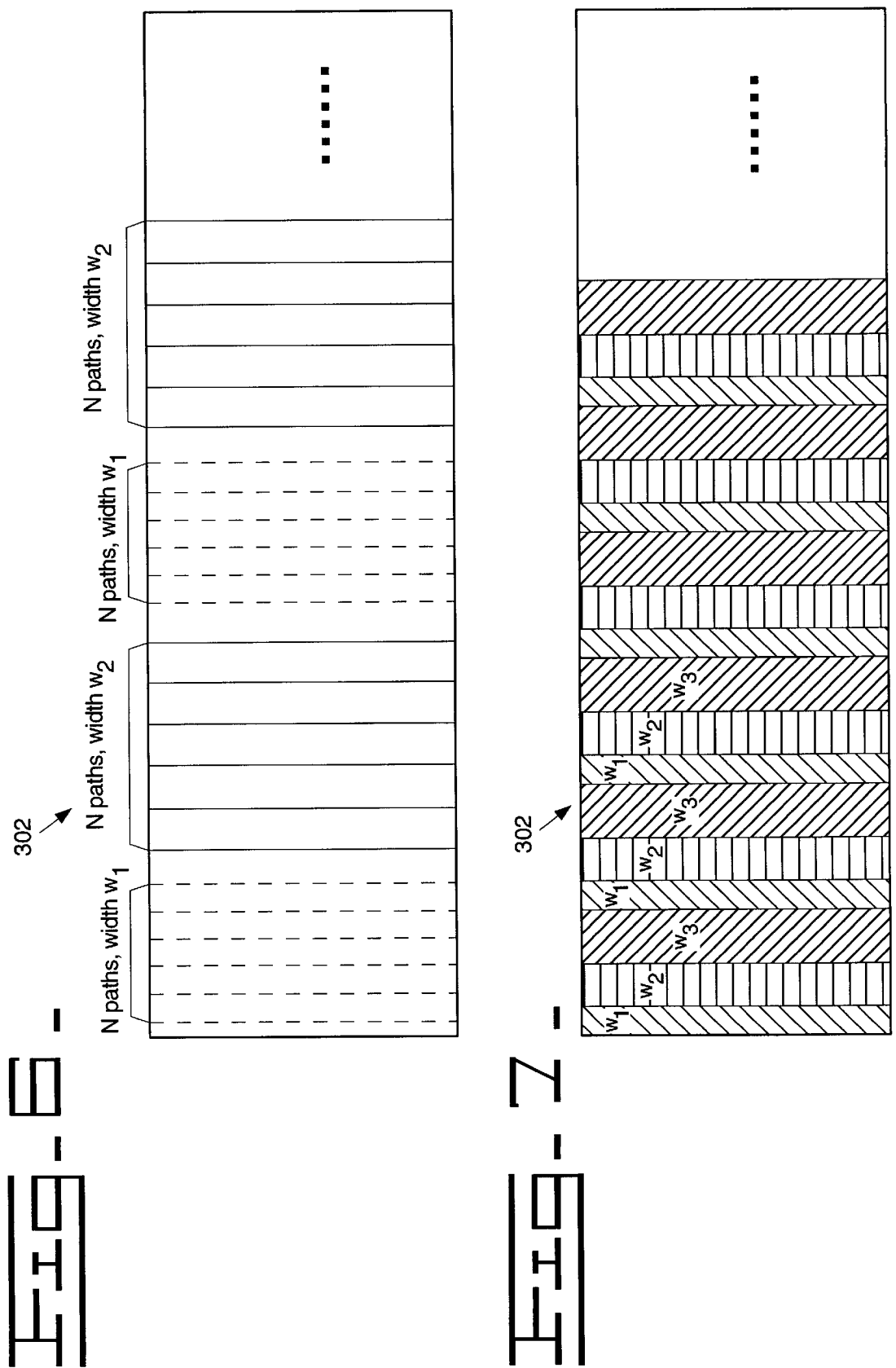

METHOD AND APPARATUS FOR PROVIDING AUTOGUIDANCE FOR MULTIPLE AGRICULTURAL MACHINES

TECHNICAL FIELD

This invention relates generally to a method and apparatus for providing autoguidance for a plurality of agricultural machines in a field and, more particularly, to a method and apparatus for defining and communicating path parameters between a first agricultural machine and a remaining plurality of agricultural machines.

BACKGROUND ART

Agricultural operations often require long, tedious hours driving over fields with agricultural machines pulling or carrying work implements, taking care to cover all desired areas efficiently, yet taking special care not to damage the crop.

With the advent of modern technologies, such as GPS positioning systems and modern control systems, advances are being made toward the autoguidance of the agricultural machines, thus helping relieve human operators from the work and fatigue of a long day in the fields.

However, many agricultural operations use multiple machines in the fields to get the work done. Even with autoguidance systems, the multiple machines must communicate and coordinate with each other to avoid conflicts, overlap, and wasted time and effort. Furthermore, the preliminary tasks of a typical autoguidance system, e.g., path planning and route determination, would be more efficiently performed if accomplished by one machine and communicated and coordinated with the remaining machines.

The present invention is directed to overcoming one or more of the problems as set forth above.

DISCLOSURE OF THE INVENTION

In one aspect of the present invention a method for providing autoguidance for a plurality of agricultural machines is disclosed. Each agricultural machine has a work implement attached. The method includes the steps of determining a reference path by a first agricultural machine, communicating the location of the reference path to each remaining agricultural machine, and determining a plurality of desired paths parallel to the reference path by each of the plurality of agricultural machines. Each plurality of desired paths is determined as a function of the width of the corresponding work implement for each respective agricultural machine.

In another aspect of the present invention an apparatus for providing autoguidance for a plurality of agricultural machines is disclosed. Each agricultural machine has a work implement attached. The apparatus includes a position determining system located on each agricultural machine, a swath manager located on each agricultural machine, and means for communicating between each agricultural machine. The apparatus also includes a processor located on each agricultural machine. The processor located on a first machine is adapted to determine a reference path, and communicate the location of the reference path to each remaining agricultural machine. The processor located on each agricultural machine is adapted to determine a plurality of desired paths parallel to the reference path. Each plurality of desired paths is determined as a function of the width of the corresponding work implement for each respective agricultural machine.

In yet another aspect of the present invention an apparatus for providing autoguidance for a plurality of agricultural machines is disclosed. Each agricultural machine has a work implement attached. The apparatus includes means for determining a reference path by a first agricultural machine, means for communicating the location of the reference path to each remaining agricultural machine, and means for determining a plurality of desired paths parallel to the reference path by each of the plurality of agricultural machines. Each plurality of desired paths is determined as a function of the width of the corresponding work implement for each respective agricultural machine.

BRIEF DESCRIPTION OF THE DRAWINGS

FIG. 3 is a diagrammatic illustration of a first and a second agricultural machine in a field in another embodiment of the present invention;

FIG. 4 is a diagrammatic illustration of a first and a second agricultural machine in a field in yet another embodiment of the present invention;

FIG. 5 is a flow diagram illustrating a preferred method of the present invention;

FIG. 6 is a diagrammatic illustration of a method for allocating portions of a field for work by a plurality of agricultural machines; and FIG. 7 is a diagrammatic illustration of an alternate method for allocating portions of a field for work by a plurality of agricultural machines.

BEST MODE FOR CARRYING OUT THE INVENTION

Figure 1:
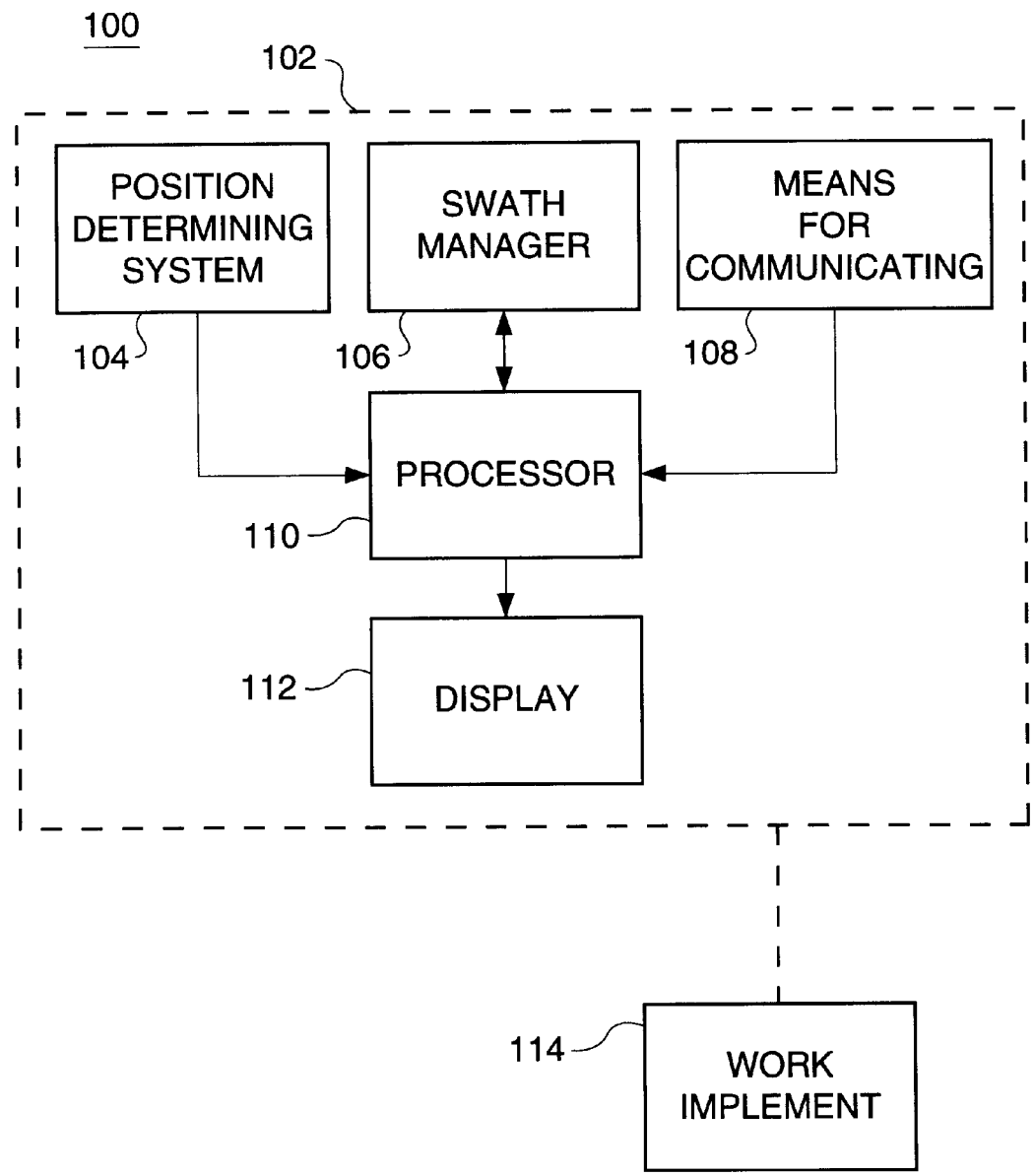
FIG. 1 is a block diagram illustrating a preferred embodiment of the present invention.

Referring to the drawings, a method and apparatus 100 for providing autoguidance for a plurality of agricultural machines 102 in a field 302 is disclosed. Each agricultural machine 102 has a work implement 114 attached. Although the invention is described below primarily with reference to two agricultural machines 102, it is understood that the present invention is suitable for use with any number of agricultural machines 102, each agricultural machine 102 having a work implement 114 attached. The work implements 114 may have common widths and characteristics or, alternatively, the work implements 114 may differ in width and function.

Examples of agricultural machines 102 suited for use with the present invention include, but are not limited to, tractors, combines, harvesters, fertilizer and chemical spreaders, and the like. Examples of work implements 114 include, but are not limited to, seeders, cutter bars, chemical sprayers, threshers, plows, and the like.

Referring to FIG. 1, a block diagram illustrating a preferred embodiment of the present invention is shown. The apparatus 100 shown is preferably located on each of the agricultural machines 102 used with the present invention.

A position determining system 104, located on the agricultural machine 102, is adapted to determine the position and heading of the agricultural machine 102. Preferably, the position determining system 104 includes a GPS antenna and receiver (not shown). However, other types of position determining systems may be used, e.g., laser positioning systems, dead reckoning systems, and the like. In addition, the position determining system 104 may include a combination of position determining technologies.

A swath manager 106, located on the agricultural machine 102, includes data relative to the surrounding environment, including characteristics of the field 302, such as boundaries and field conditions. The swath manager 106 also includes data relative to the positions and headings of each of the agricultural machines 102. In addition, the swath manager 106 receives additional data relative to the work being performed by the agricultural machines 102. The swath manager 106 is further adapted to determine the swaths, i.e., the widths of the paths being traversed, of the agricultural machines 102.

Means 108 for communicating between the agricultural machines 102 is located on each agricultural machine 102. In the preferred embodiment, the means 108 for communicating may be any type of wireless communications system suitable for communicating between mobile machines, including, but not limited to, wireless radio, cellular technology, and the like.

Figure 2:
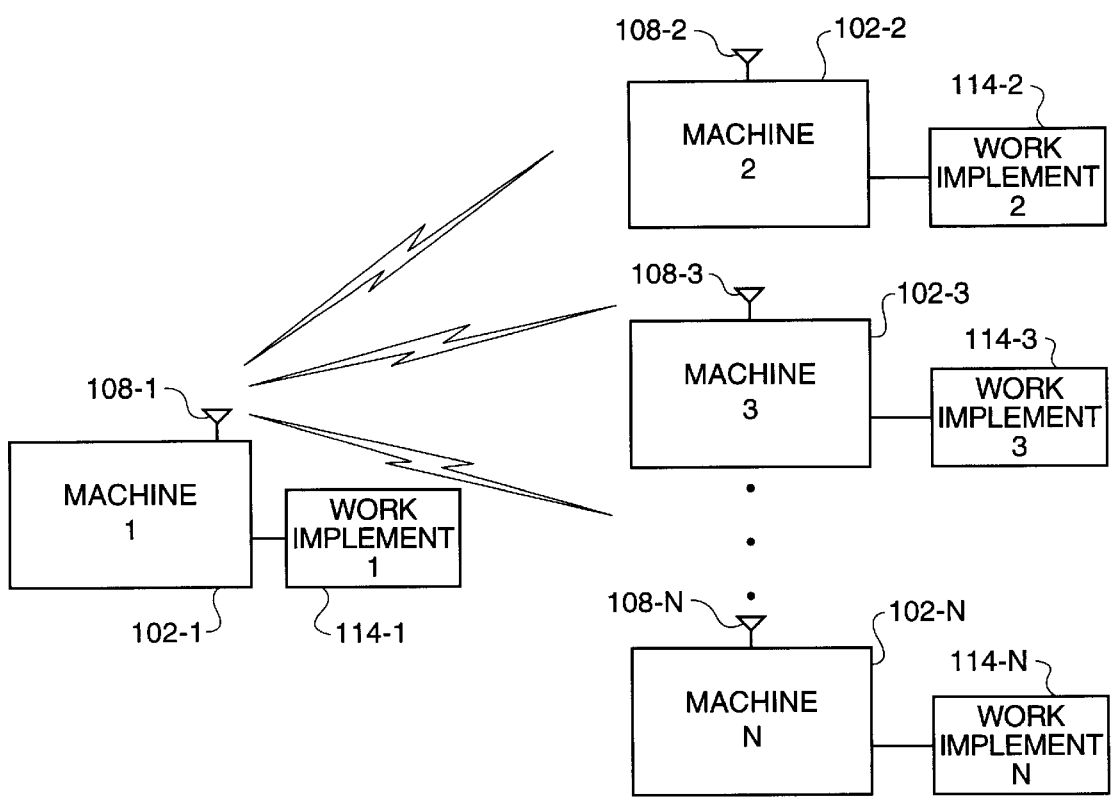
FIG. 2 is a block diagram illustrating another aspect of a preferred embodiment of the present invention.

Referring to FIG. 2, a block diagram illustrating N agricultural machines 102-1 to 102-N is shown. Each agricultural machine 102 includes a means 108 for communication 108-1 to 108-N capable of communicating with each of the other agricultural machines 102.

A processor 110, located on the agricultural machine 102, is adapted to determine a reference path 308 on a first agricultural machine 102-1. The reference path 308, as shown in FIG. 3, has a start point 304 and an end point 306. The reference path 308 may be straight or curved, depending upon the characteristics of the field 302.

The processor 110 on the first agricultural machine 102-1 is further adapted to communicate the location of the reference path 308 to each remaining agricultural machine 102-2 to 102-N using the means 108 for communication.

The processor 110 on each agricultural machine 102-1 to 102-N is further adapted to determine a plurality of desired paths parallel to the reference path 308. Each plurality of desired paths is determined as a function of the width of the corresponding work implement 114-1 to 114-N attached to each respective agricultural machine 102-1 to 102-N.

In one embodiment, each work implement 114-1 to 114-N is of the same width and therefore each plurality of desired paths has swaths equal in width to each other. In this embodiment, the agricultural machines 102-1 to 102-N are not constrained to any particular portions of the field 302, and may freely move about in coordination with the remaining agricultural machines 102.

In another embodiment, the work implements 114-1 to 114-N have different widths, i.e., they perform work on different swath widths. For example, the first agricultural machine 102-1 may have a work implement 114-1 that is 12 rows wide, and the Nth agricultural machine 102-N may have a work implement 114-N that is 8 rows wide. Therefore, the plurality of desired paths for each agricultural machine 102-1, 102-N will be determined to correspond to a 12 row work implement 114-1 and an 8 row work implement 114-N, respectively.

In the embodiment where the work implements 114-1 to 114-N have different widths, it is desired to coordinate the portions of the field 302 covered by each agricultural machine 102-1 to 102-N. Two exemplary methods for coordinating the movement of agricultural machines 102-1 to 102-N having work implements 114-1 to 114-N of different widths are illustrated in FIGS. 6 and 7.

In FIG. 6, the field 302 is divided into blocks of paths. Each block of paths has a plurality of desired paths, each desired path having a swath corresponding to the width of the work implement 114 attached to the agricultural machine 102 assigned to traverse that block of paths.

In FIG. 7, the field 302 is divided into alternating paths. Each set of alternating paths, e.g., $w_1$, $w_2$, and $w_3$, is a plurality of desired paths having a swath corresponding to the width of the work implement 114 attached to the agricultural machine 102 assigned to traverse that set of alternating paths. For example, three agricultural machines 102-1, 102-2, 102-3 (not shown) may be assigned to traverse paths $w_1$, $w_2$, and $w_3$, respectively. As agricultural machine 102-1 completes a first path $w_1$, the machine will cross over paths $w_2$ and $w_3$, and begin work on a second path $w_1$.

It is to be understood that other methods for assigning portions of the field 302 to each of a plurality of agricultural machines 102 may be used without deviating from the spirit of the present invention.

In the preferred embodiment, a display 112, located on the agricultural machine 102, is adapted to display various information such as the positions and headings of each of the agricultural machines 102-1 to 102-N with respect to the plurality of desired paths. Preferably, the plurality of desired paths displayed will be those desired paths relevant to the particular agricultural machine 102 having that display 112. For example, the display 112 on an agricultural machine 102 having a 12 row work implement 114 will show a different plurality of desired paths than the display 112 on an agricultural machine 102 having an 8 row work implement 114.

In an alternate embodiment, a display 112 is not used. For example, in an embodiment where the swaths have the same width throughout the field 302, it may be determined that a display is not needed.

In addition, as the swath manager 106 is updated with respect to the work being performed by the agricultural machines 102-1 to 102-N, the display 112, in the preferred embodiment, is adapted to update the information being displayed, either graphically, numerically, a combination of graphically and numerically, or by some other means.

Referring to FIG. 4, a diagrammatic illustration of two agricultural machines 102-1, 102-N as they traverse a field 302 is shown. The format of the illustration of FIG. 4 is an exemplary illustration of a suitable format for the display 112. It is to be understood that, while two agricultural machines 102-1, 102-N are shown, any number of agricultural machines 102-1 to 102-N may be displayed.

The field 302 is surrounded by headland 402, i.e., strips of unplowed land around the perimeter of the field 302. The reference path 308, determined initially by the first agricultural machine 102-1, is shown from the start point 304, designated as A, to the end point 306, designated as B.

Areas of the field 302 of interest include completed portions 404 of the field 302, shown in FIG. 4 with diagonal lines, occupied portions 406 of the field 302, shown as desired paths with dotted lines, and available portions 408 of the field 302. The completed portions 404 of the field 302 are those areas that have been worked by one of the agricultural machines 102-1, 102-N. The occupied portions 406 of the field 302 are those desired paths that are being traversed by an agricultural machine 102-1, 102-N. The available portions 408 of the field 302 are the remaining portions of the field 302 which need to be worked.

Preferably, additional information could be displayed as needed. For example, portions of the field 302 not suited for agricultural work, or portions of the field which do not require work, may be displayed.

Referring to FIG. 5, a flow diagram illustrating a preferred method of the present invention is shown.

In a first control block 502, a first position of the first agricultural machine 102-1 is determined. The first position corresponds to the start point 304 of the reference path 308. In a second control block 504, a second position of the first agricultural machine 102-1 is determined. The second position corresponds to the end point 306 of the reference path 308. Control then proceeds to a third control block 506, where the reference path 308 from the start point 304 to the end point 306 is determined. The reference path 308 may be straight or curved, depending on characteristics of the field 302.

In a fourth control block 508, the location of the reference path 308 from the first agricultural machine 102-1 to the remaining agricultural machines 102-2 to 102-N is communicated. In one embodiment, the start point 304 and the end point 306 are communicated, and each agricultural machine 102-1 to 102-N determines a reference path 308. In an alternate embodiment, the reference path 308, including the start point 304 and the end point 306, is communicated to each remaining agricultural machine 102-2 to 102-N from the first agricultural machine 102-1.

Control then proceeds to a fifth control block 510, where each agricultural machine 102-1 to 102-N determines a plurality of desired paths parallel to the reference path 308. Each plurality of desired paths is determined as a function of the width of the corresponding work implement 114-1 to 114-N for each respective agricultural machine 102-1 to 102-N, as described above.

In a sixth control block 512, the position and heading of each agricultural machine 102-1 to 102-N is determined. In a seventh control block 514, each agricultural machine 102-1 to 102-N stores the plurality of desired paths in the swath manager 106 for use as needed. In an eighth control block 516, the position and heading of each agricultural machine 102 is communicated to each of the other agricultural machines 102. Preferably, the position and heading of each agricultural machine 102 is communicated on a periodic and regular basis to maintain up-to-date position information in the swath manager 106 and on the display 112.

In a ninth control block 518, the swath manager 106 on each agricultural machine 102 is updated as a function of the work performed by the agricultural machine 102. For example, if the agricultural machine 102 is harvesting crop, the areas harvested are updated in the swath manager 106 periodically and regularly.

Control then proceeds to a tenth control block 520, where the updated swath manager is communicated from each agricultural machine 102 to all other agricultural machines 102. In an eleventh control block 522, each agricultural machine 102 displays the positions and headings of all agricultural machines 102. In addition, the updated swath map 106 is displayed.

Industrial Applicability

As an example of an application of the present invention, it is common to employ more than one agricultural machine into a field to perform the needed work more efficiently. In this environment, it is important for the agricultural machines to communicate with each other to maintain an awareness of the status of the machines and the work being done.

In addition, as autoguidance of agricultural machines becomes more widely used, it is highly beneficial to communicate between machines to share information necessary for autoguidance to function. In this manner, the determinations needed for autoguidance can be made by one machine and shared with the other agricultural machines for more efficient operation.

Other aspects, objects, and features of the present invention can be obtained from a study of the drawings, the disclosure, and the appended claims.

What is claimed is:

1. A method for providing autoguidance for a plurality of agricultural machines in a field, each agricultural machine having a work implement attached, including the steps of:

determining a reference path by a first agricultural machine, the reference path having a start point and an end point;

communicating the location of the reference path to each remaining agricultural machine; and determining a plurality of desired paths parallel to the reference path by each of the plurality of agricultural machines, each plurality of desired paths being determined as a function of the width of the corresponding work implement for each respective agricultural machine.

2. A method, as set forth in claim 1, wherein determining a reference path includes the steps of:

determining a first position of the first agricultural machine, the first position corresponding to the start point;

determining a second position of the first agricultural machine, the second position corresponding to the end point; and determining the reference path from the first position to the second position as a function of geographical constraints of the field.

3. A method, as set forth in claim 2, further including the step of determining the position and heading of each agricultural machine.

4. A method, as set forth in claim 3, further including the step of storing each plurality of desired paths in a swath manager located on each respective agricultural machine.

5. A method, as set forth in claim 4, further including the step of updating the swath manager on each agricultural machine as a function of the work performed by each respective agricultural machine.

6. A method, as set forth in claim 5, further including the steps of:

communicating the position and heading of each agricultural machine to each other agricultural machine; and communicating the updated swath manager data from each agricultural machine to each other agricultural machine.

7. A method, as set forth in claim 6, further including the step of displaying the swath manager data on a display located on each agricultural machine.

8. A method, as set forth in claim 7, wherein the displayed data includes the positions and headings of the plurality of agricultural machines with respect to the plurality of desired paths.

9. A method, as set forth in claim 7, wherein the displayed data includes the updated swath manager data of the work being performed by the plurality of agricultural machines.

10. A method, as set forth in claim 1, wherein the width of each work implement is substantially the same as the width of each other work implement.

11. A method, as set forth in claim 1, wherein the width of at least one work implement is substantially different than the width of at least one other work implement.

12. A method, as set forth in claim 11, wherein each plurality of desired paths is determined as a block of paths with respect to each other plurality of desired paths.

13. A method, as set forth in claim 11, wherein each plurality of desired paths is determined as an alternating series of paths with respect to each other plurality of desired paths.

14. An apparatus for providing autoguidance for a plurality of agricultural machines in a field, each agricultural machine having a work implement attached, comprising:

a position determining system located on each agricultural machine;

a swath manager located on each agricultural machine;

means for communicating between each agricultural machine; and a processor located on each agricultural machine;

wherein the processor located on a first agricultural machine is adapted to determine a reference path having a start point and an end point, and communicate the location of the reference path to each remaining agricultural machine; and wherein the processor located on each agricultural machine is adapted to determine a plurality of desired paths parallel to the reference path, each plurality of desired paths being determined as a function of the width of the corresponding work implement for each respective agricultural machine.

15. An apparatus, as set forth in claim 14, further including a display located on each agricultural machine.

16. An apparatus, as set forth in claim 15, wherein the display on each agricultural machine is adapted to display the positions and headings of the plurality of agricultural machines with respect to the plurality of desired paths.

17. An apparatus, as set forth in claim 15, wherein the display on each agricultural machine is adapted to display updated swath manager data of the work being performed by the plurality of agricultural machines.

18. An apparatus for providing autoguidance for a plurality of agricultural machines in a field, each agricultural machine having a work implement attached, comprising:

means for determining a reference path by a first agricultural machine, the reference path having a start point and an end point;

means for communicating the location of the reference path to each remaining agricultural machine; and means for determining a plurality of desired paths parallel to the reference path by each of the plurality of agricultural machines, each plurality of desired paths being determined as a function of the width of the corresponding work implement for each respective agricultural machine.

19. An apparatus, as set forth in claim 18, wherein the means for determining a reference path includes:

means for determining a first position of the first agricultural machine, the first position corresponding to the start point;

means for determining a second position of the first agricultural machine, the second position corresponding to the end point; and means for determining the reference path from the first position to the second position as a function of geographical constraints of the field.

20. An apparatus, as set forth in claim 19, further including means for determining the position and heading of each agricultural machine.

21. An apparatus, as set forth in claim 20, further including means for storing each plurality of desired paths in a swath manager located on each respective agricultural machine.

22. An apparatus, as set forth in claim 21, further including means for updating the swath manager on each agricultural machine as a function of the work performed by each respective agricultural machine.

23. An apparatus, as set forth in claim 22, further including:

means for communicating the position and heading of each agricultural machine to each other agricultural machine; and means for communicating the updated swath manager data from each agricultural machine to each other agricultural machine.

24. An apparatus, as set forth in claim 23, further including means for displaying the swath manager data on each agricultural machine, the means for displaying including displays of the positions and headings of the plurality of agricultural machines with respect to the plurality of desired paths, and updated swath manager data of the work being performed by the plurality of agricultural machines.

* * * * *